US012600069B2

(12) United States Patent
Lecours

(10) Patent No.: US 12,600,069 B2
(45) Date of Patent: Apr. 14, 2026

(54) MOLDING AND SLIDE APPARATUS SYSTEM

(71) Applicant: Marc Lecours, Windsor (CA)

(72) Inventor: Marc Lecours, Windsor (CA)

(73) Assignee: MICHMAR DESIGNS INC., Windsor (CA)

( * ) Notice: Subject to any disclaimer, the term of this patent is extended or adjusted under 35 U.S.C. 154(b) by 356 days.

(21) Appl. No.: 16/704,381

(22) Filed: Dec. 5, 2019

(65) Prior Publication Data

US 2024/0017457 A1 Jan. 18, 2024

(51) Int. Cl.
B29C 45/36 (2006.01)
(52) U.S. Cl.
CPC ........ B29C 45/36 (2013.01); *B29C 2045/363* (2013.01)
(58) Field of Classification Search
None
See application file for complete search history.

(56) References Cited

U.S. PATENT DOCUMENTS

2005/0208172 A1 9/2005 Buttigieg

FOREIGN PATENT DOCUMENTS

| JP | H01214420 | 8/1989 |
| JP | 2005205790 | 8/2005 |
| JP | 6229091 | 11/2017 |

*Primary Examiner* — Armand Melendez
(74) *Attorney, Agent, or Firm* — Carlson, Gaskey & Olds, P.C.

(57) ABSTRACT

A novel mold and slide apparatus system comprises at least a first mold member and a second mold member that together define an internal cavitation. A slide apparatus is mounted on the first mold member for moving an insert member into and out of an internal cavitation in the first mold member. The slide apparatus comprises a main body having a drive cylinder defining a drive-cylinder axis and a carrier cylinder defining a carrier-cylinder axis. A drive piston is disposed in sealed sliding relation in the drive cylinder for movement along the drive-cylinder axis between a start position and a fluid displacement position. a carrier piston is disposed in sealed sliding relation in the carrier cylinder for movement along the carrier-cylinder axis between a retracted position and an extended position. The insert member is connected to the carrier piston for movement therewith for engaging the internal cavitation when the carrier piston is in the extended position. A fluid communication passage interconnects the drive cylinder and the carrier cylinder in fluid communication one with the other, with the fluid communication passage filled with hydraulic fluid. Movement of the drive piston from its start position to its fluid displacement position causes, via the hydraulic fluid, the carrier piston to move from its retracted position to its extended position. Movement of the carrier piston from its extended position to its retracted position causes, via the hydraulic fluid, the drive piston to move from its fluid displacement position to its start position. An actuator is movable between a non-actuating position and an actuating position. Movement of the actuator from its non-actuating position to its actuating position causes the drive piston to move from its start position to its fluid displacement position, thereby causing the carrier piston to move from its retracted position and its extended position to correspondingly move the insert member into the internal cavitation during a molding operation. A biasing mechanism is operable to return the carrier piston to the retracted position.

11 Claims, 16 Drawing Sheets

MOLDING AND SLIDE APPARATUS SYSTEM

FIELD OF THE INVENTION

The present invention relates to mold and slide apparatus systems, and more particularly to mold and slide apparatus systems wherein the slide apparatus is hydraulically operational.

BACKGROUND OF THE INVENTION

In manufacturing operations including conventional plastic molding, such as injection molding, it is common to bring two mold halves or two die halves together, to form an internal cavitation. A material such as molten plastic, is injected into the internal cavitation to ultimately form a molded part. In some instances, a slide member is used to temporarily cyclically insert an end portion of an insert member, often referred to as a pin member, into the internal cavitation. The insert member needs to be present during the introduction of molten plastic into the internal cavitation but be removed prior to expelling the molded part from the internal cavitation.

In order to time the insertion and removal cycle of the insert member, the slide member makes use of movement of the movable (usually vertically movable) cavity block to push the insert member into place into the internal cavitation. More specifically, a contact surface on an angled horn pin mounted on the mold core, or on a retention plate or the like secured to the mold core, moves the insert member into place when the cavity block moves down into place on the core block. A similarly angled contact surface on a heel block abuts against the movable slide member to help retain the slide member in place during the molding operation.

Although conventional slide members are very common and generally work well, there are some disadvantages and problems associated with them. For instance, it can be difficult to accurately align the horn pin into the co-operating narrow alignment opening in the slide member. Also, significant friction between the horn pin and the portion of the surface of the slide member that defines the alignment opening can cause excessive wear of the slide member. Further, mounting a conventional slide usually takes several threaded fasteners, which is time consuming. Even further, conventional slides can be difficult to adjust in terms of "fine tuning" their position.

One such prior art slide member can be found in United States Published Patent Application 2005/0208172A published Sep. 22, 2005, to Buttigieg and entitled Mold Assembly. The mold assembly has a cavity for molding that is defined by primary mold cavity and primary mold core elements and a supplemental core element. The primary mold cavity and primary mold core elements are carried by first and second mating mold components and the supplemental core element is carried by a slide moveable transversely relative to the direction of motion of the mating mold components. The slide is supported by the first mating mold component and has an opening therein for engaging an angled actuating pin supported by the second mating mold component at an angle oblique to the parting line face of the second mating mold component. The angled actuating pin is removably retained in a support opening in the parting line face of the second mating mold component by means accessible from the second mating mold component parting line face. This mold assembly and slide experience the problems that are typically experienced in the prior art.

It is an object of the present invention to provide a slide apparatus that overcomes the known problems and disadvantages of conventional prior art slide members.

It is an object of the present invention to provide a slide apparatus that does not have a horn pin.

It is an object of the present invention to provide a slide apparatus that does not experience the problem of significant friction.

It is an object of the present invention to provide a slide apparatus that does not experience the problem of excessive wear of the slide member.

It is an object of the present invention to provide a slide apparatus that takes fewer threaded fasteners to mount.

It is an object of the present invention to provide a slide apparatus that does not experience the problem of being difficult to adjust in terms of "fine tuning" its position.

It is an object of the present invention to provide a slide apparatus that does not have wear plates.

It is an object of the present invention to provide a slide apparatus that does not have gibs, which are used to guide and control linear movement of the slide member.

SUMMARY OF THE INVENTION

In accordance with another aspect of the present invention there is disclosed a novel slide apparatus mountable on a mold member with an actuator movable between a non-actuating position and an actuating position, for moving an insert member into and out of an internal cavitation in the mold member. The slide apparatus comprises a main body having a drive cylinder defining a drive-cylinder axis and a carrier cylinder defining a carrier-cylinder axis. A drive piston is disposed in sealed sliding relation in the drive cylinder for movement along the drive-cylinder axis between a start position and a fluid displacement position. a carrier piston is disposed in sealed sliding relation in the carrier cylinder for movement along the carrier-cylinder axis between a retracted position and an extended position. The insert member is connected to the carrier piston for movement therewith for engaging the internal cavitation when the carrier piston is in the extended position. A fluid communication passage interconnects the drive cylinder and the carrier cylinder in fluid communication one with the other, with the fluid communication passage filled with hydraulic fluid. Movement of the drive piston from its start position to its fluid displacement position causes, via the hydraulic fluid, the carrier piston to move from its retracted position to its extended position. Movement of the carrier piston from its extended position to its retracted position causes, via the hydraulic fluid, the drive piston to move from its fluid displacement position to its start position. Movement of the actuator from its non-actuating position to its actuating position causes the drive piston to move from its extended position to its retracted position, thereby causing the carrier piston to move from its retracted position and its extended position to correspondingly move the insert member into the internal cavitation. A biasing mechanism is operable to return the carrier piston to the retracted position.

In accordance with one aspect of the present invention there is disclosed a novel mold and slide apparatus system comprising at least a first mold member and a second mold member that together define an internal cavitation. A slide apparatus is mounted on the first mold member for moving an insert member into and out of an internal cavitation in the first mold member. The slide apparatus comprises a main body having a drive cylinder defining a drive-cylinder axis and a carrier cylinder defining a carrier-cylinder axis. A drive piston is disposed in sealed sliding relation in the drive cylinder for movement along the drive-cylinder axis between a start position and a fluid displacement position. a carrier piston is disposed in sealed sliding relation in the carrier cylinder for movement along the carrier-cylinder axis between a retracted position and an extended position. The insert member is connected to the carrier piston for movement therewith for engaging the internal cavitation when the carrier piston is in the extended position. A fluid communication passage interconnects the drive cylinder and the carrier cylinder in fluid communication one with the other, with the fluid communication passage filled with hydraulic fluid. Movement of the drive piston from its start position to its fluid displacement position causes, via the hydraulic fluid, the carrier piston to move from its retracted position to its extended position. Movement of the carrier piston from its extended position to its retracted position causes, via the hydraulic fluid, the drive piston to move from its fluid displacement position to its start position. An actuator is movable between a non-actuating position and an actuating position. Movement of the actuator from its non-actuating position to its actuating position causes the drive piston to move from its start position to its fluid displacement position, thereby causing the carrier piston to move from its retracted position and its extended position to correspondingly move the insert member into the internal cavitation during a molding operation. A biasing mechanism is operable to return the carrier piston to the retracted position.

In accordance with another aspect of the present invention there is disclosed a novel mold cavity block for actuating a slide apparatus mounted on a mold core block. The mold cavity block comprises a main body member. An actuator movable between a non-actuating position and an actuating position to thereby actuate the slide apparatus and correspondingly control the movement of the insert member of the slide apparatus into and out of the internal cavitation. A slide stop portion for engaging a contact portion of the slide apparatus, to thereby retain the slide apparatus in place on the mold core block during the molding operation.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the mold and slide apparatus system for use therewith according to the present invention, as to its structure, organization, use and method of operation, together with further objectives and advantages thereof, will be better understood from the following drawings in which a presently known embodiment of the invention will now be illustrated by way of example. It is expressly understood, however, that the drawings are for the purpose of illustration and description only, and are not intended as a definition of the limits of the invention. In the accompanying drawings.

Figure 1:
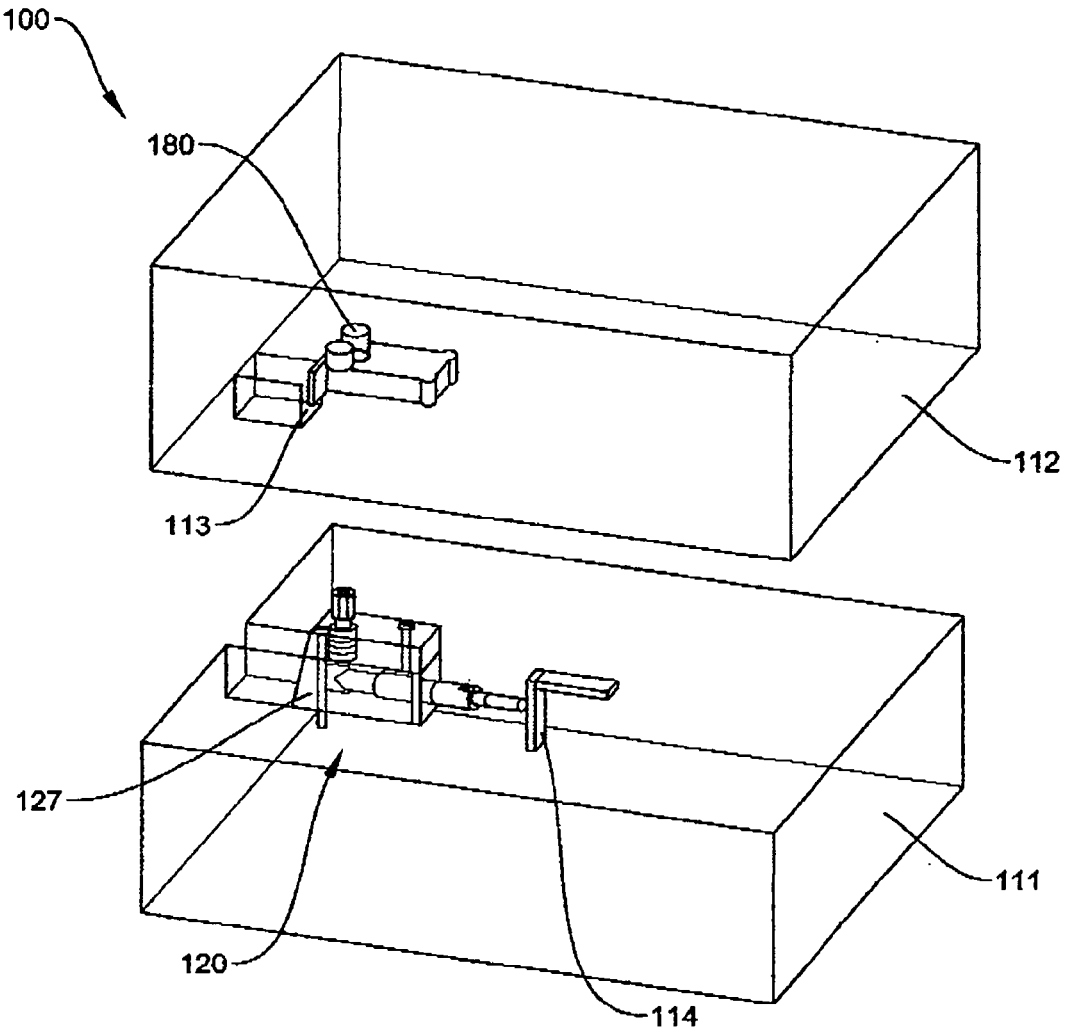
FIG. 1 is a perspective view of a first illustrated embodiment of the mold and slide apparatus system according to the present invention, with the mold cavity block in a raised position above the mold core block such that the mold and slide apparatus system is in an open configuration.

<div style="text-align: center">PARTS LIST AND REFERENCE NUMERALS</div>

100 mold and slide apparatus system
111 first mold member
111*a* receiving aperture
112 second mold member
113 slide stop portion (slide stop)
114 internal cavitation
115 threaded fasteners
120 slide apparatus
122 main body
123*b* annular boss
123*s* annular shoulder
124 fluid communication passage
125 hydraulic fluid
126 slide stop arrangement
127 contact portion (contact surface)
130 drive cylinder
132 drive-cylinder seal
134 snap ring
140 carrier cylinder
142 carrier-cylinder cover plate
144 threaded fasteners
150 drive piston
151 carrying hydraulic seals
152 drive-piston shaft
154 actuator receiving surface
155 displacement adjustment mechanism
155*n* adjusting nut
155*f* locking threaded fastener
160 carrier piston
161 carrying hydraulic seals
162 carrier-piston shaft
163 pair of opposed alignment surfaces
164 insert carrier
164*a* first pair of opposed alignment surface
164*b* second pair of opposed alignment surface
164*p* proximal end
164*d* distal end
165 co-operating recess
167 threaded fastener
170 insert member
171 pair of opposed alignment surfaces
172 head portion
174 insertable portion
180 actuator
190 biasing mechanism
192 coil spring member
194 co-operating recess
"C" carrier cylinder axis
"D" drive-cylinder axis
200 mold and slide apparatus system
212 second mold member
220 slide assembly
222 main body
225 hydraulic fluid
240 carrier cylinder
250 drive piston
260 carrier piston
280 actuator
290 biasing mechanism
291*t* top plug
291*s* side plug

292 air chamber
294 access passage

<div style="text-align: center">DETAILED DESCRIPTION OF THE<br>ILLUSTRATED EMBODIMENTS</div>

Referring to FIGS. 1 through 23 of the drawings, it will be noted that FIGS. 1 through 18 show a first illustrated embodiment of the mold and slide apparatus system according to the present invention, as indicated by the general reference numeral 100, and FIGS. 19 through 23 show a second illustrated embodiment of the mold and slide apparatus system according to the present invention, as indicated by the general reference numeral 100. As can be readily seen in the Figures, the first illustrated embodiment mold and slide apparatus system 100 and the second illustrated embodiment mold and slide apparatus system 200 are for moving an insert member into and out of an internal cavitation during a molding operation, as will be discussed in greater detail subsequently.

Reference will now be made to FIGS. 1 through 18, which show a first illustrated embodiment of the mold and slide apparatus system 100 according to the present invention. In brief, the first illustrated embodiment of the of the mold and slide apparatus system 100 comprises a first mold member 111, a second mold member 112, an internal cavitation 114, a slide apparatus 120 that comprises a main body 122, a fluid communication passage 124, a drive cylinder 130, a carrier cylinder 140, a drive piston 150, a carrier piston 160, an insert member 170, an actuator 180, and a biasing mechanism 190. It should be noted that for the sake of convenience, the two bodies that form the internal cavitation 114 have been referred to as first mold member 111 and second mold member 112. They could equally be referred to as die members.

Figure 2:
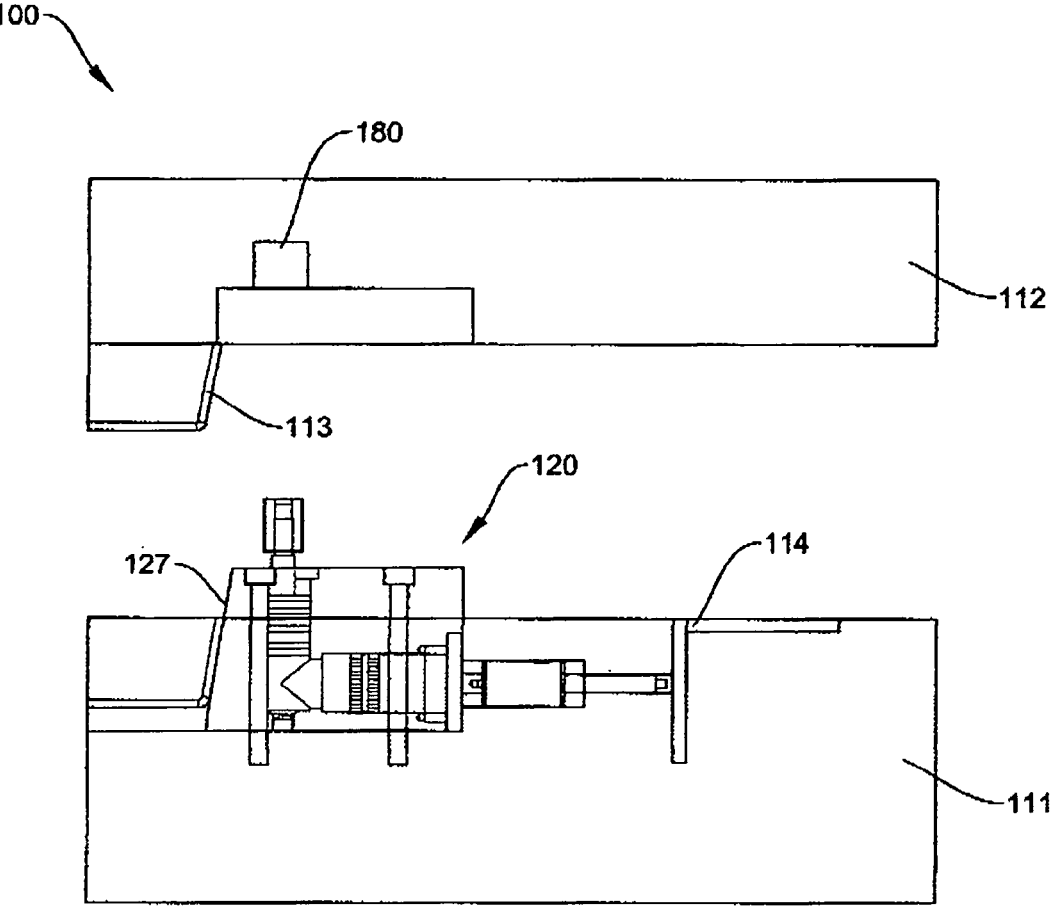
FIG. 2 is a side elevational view of the first illustrated embodiment of the mold and slide apparatus system of FIG. 1, with the mold cavity block in a raised position above the mold core block such that the mold and slide apparatus system is in an open configuration.
Figure 3:
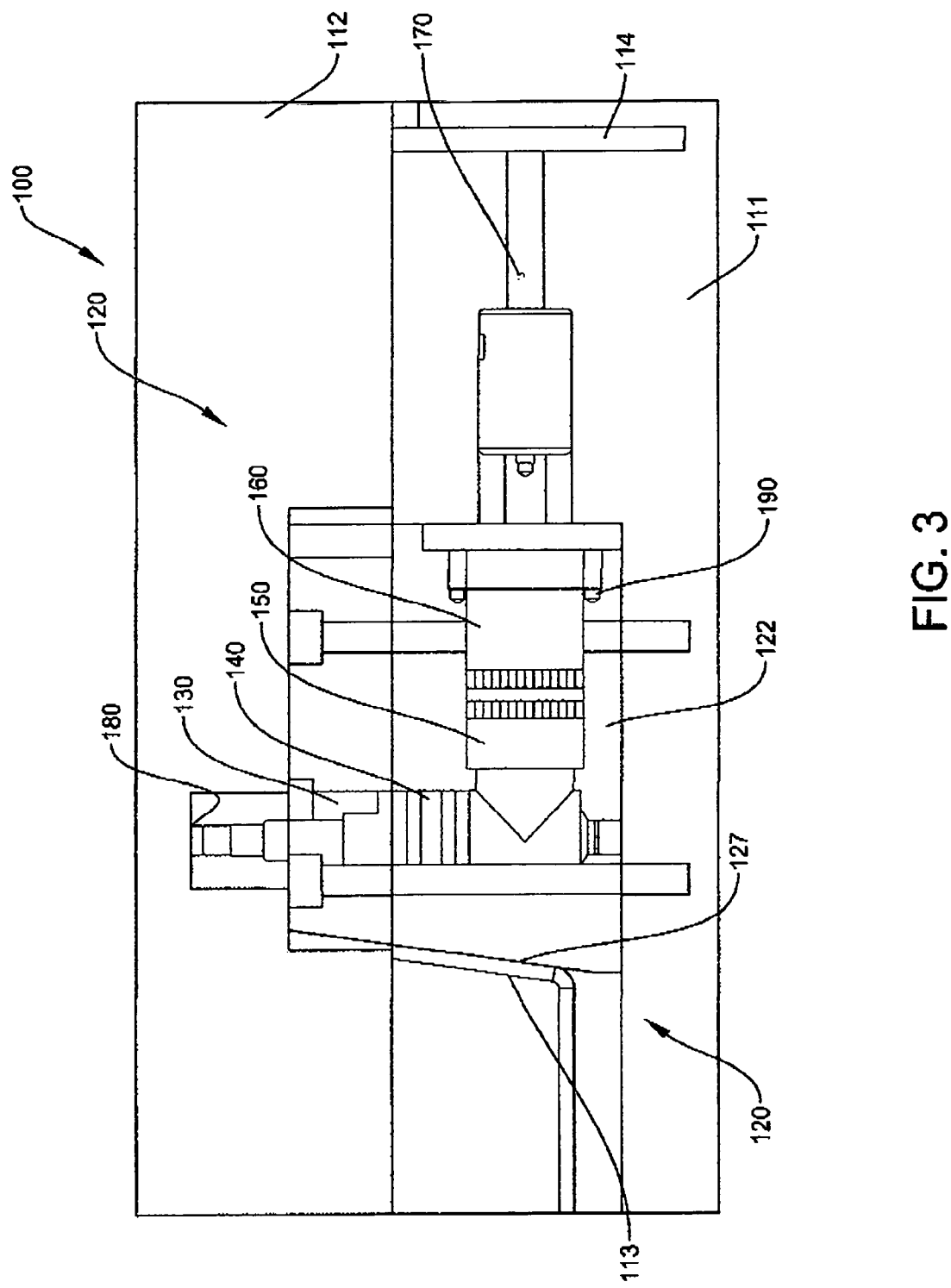
FIG. 3 is a side elevational view of the first illustrated embodiment of the mold and slide apparatus system of FIG. 1, with the mold cavity block in a lowered position on the mold core block such that the mold and slide apparatus system is in a closed configuration.
Figure 4:
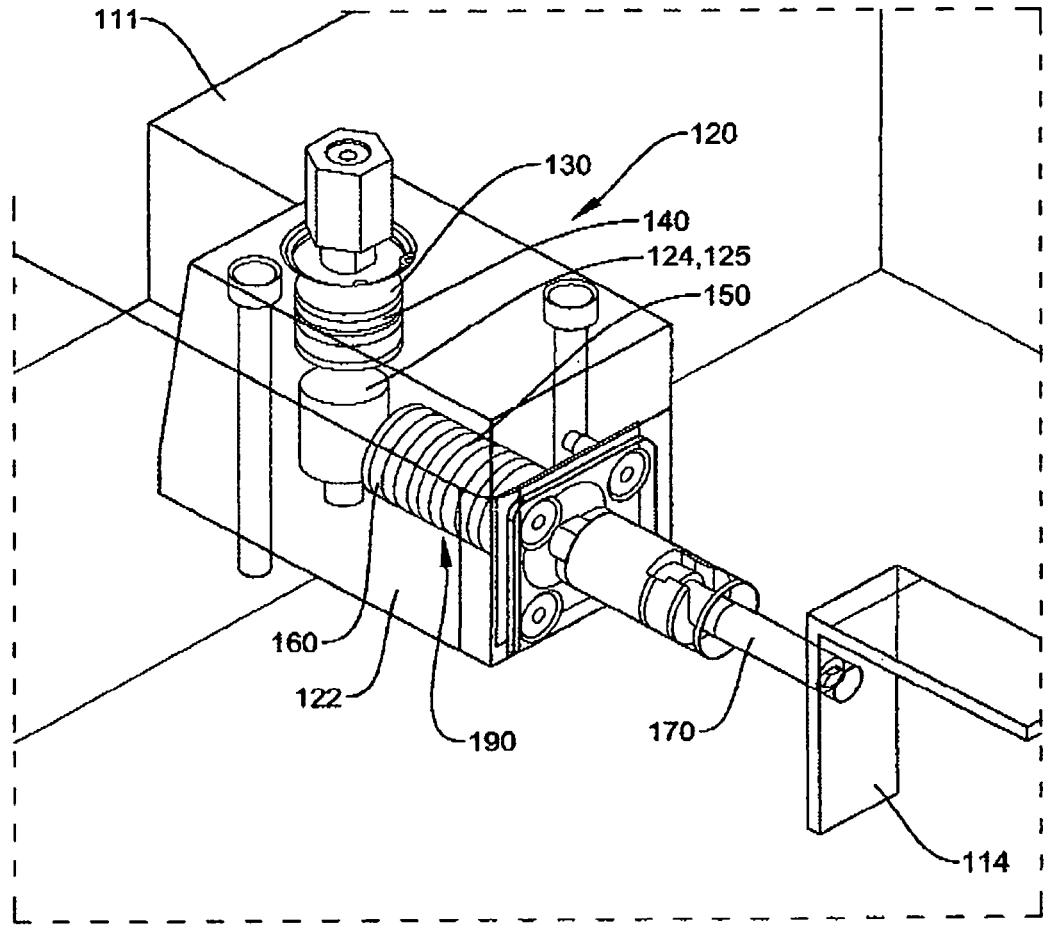
FIG. 4 is a perspective view of the first illustrated embodiment of the mold and slide apparatus system of FIG. 1, with the mold cavity block removed for the sake of clarity.
Figure 5:
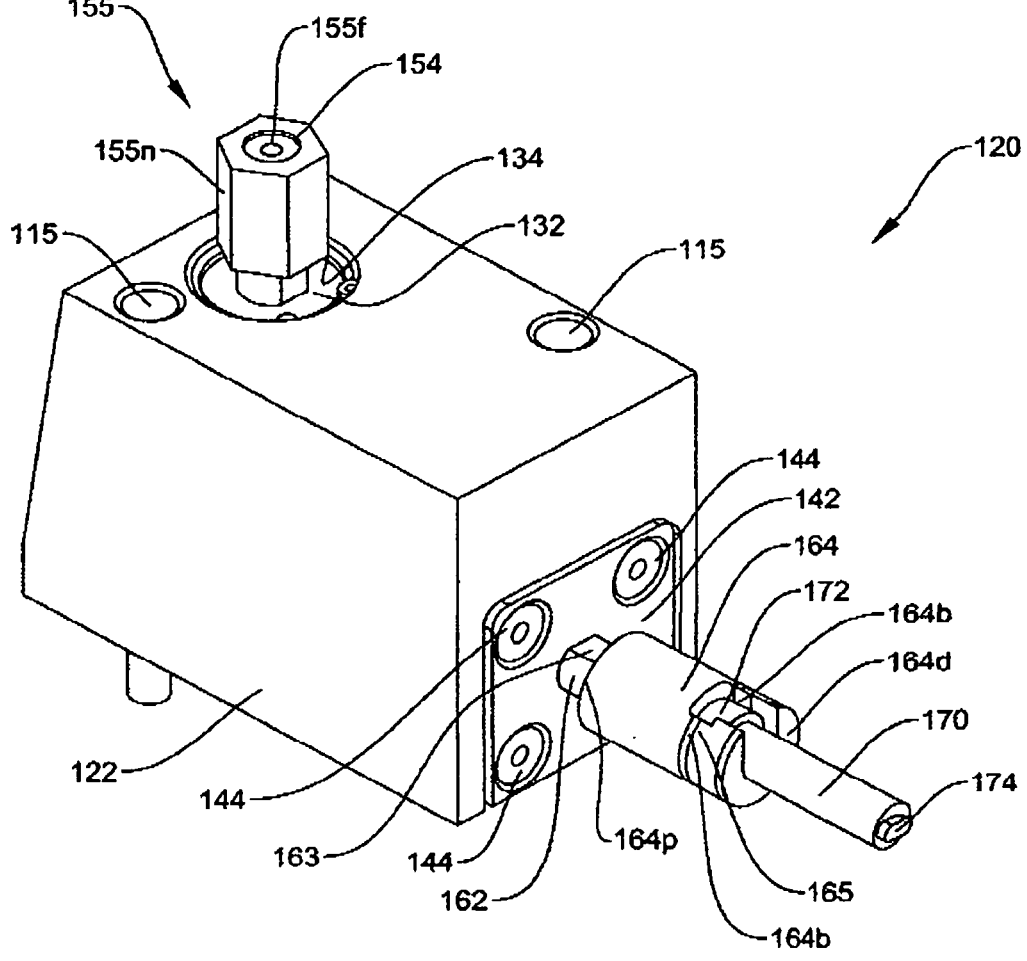
FIG. 5 is a perspective view from the core block engaging end of the first illustrated embodiment slide apparatus of FIG. 1.
Figures 6, 8:
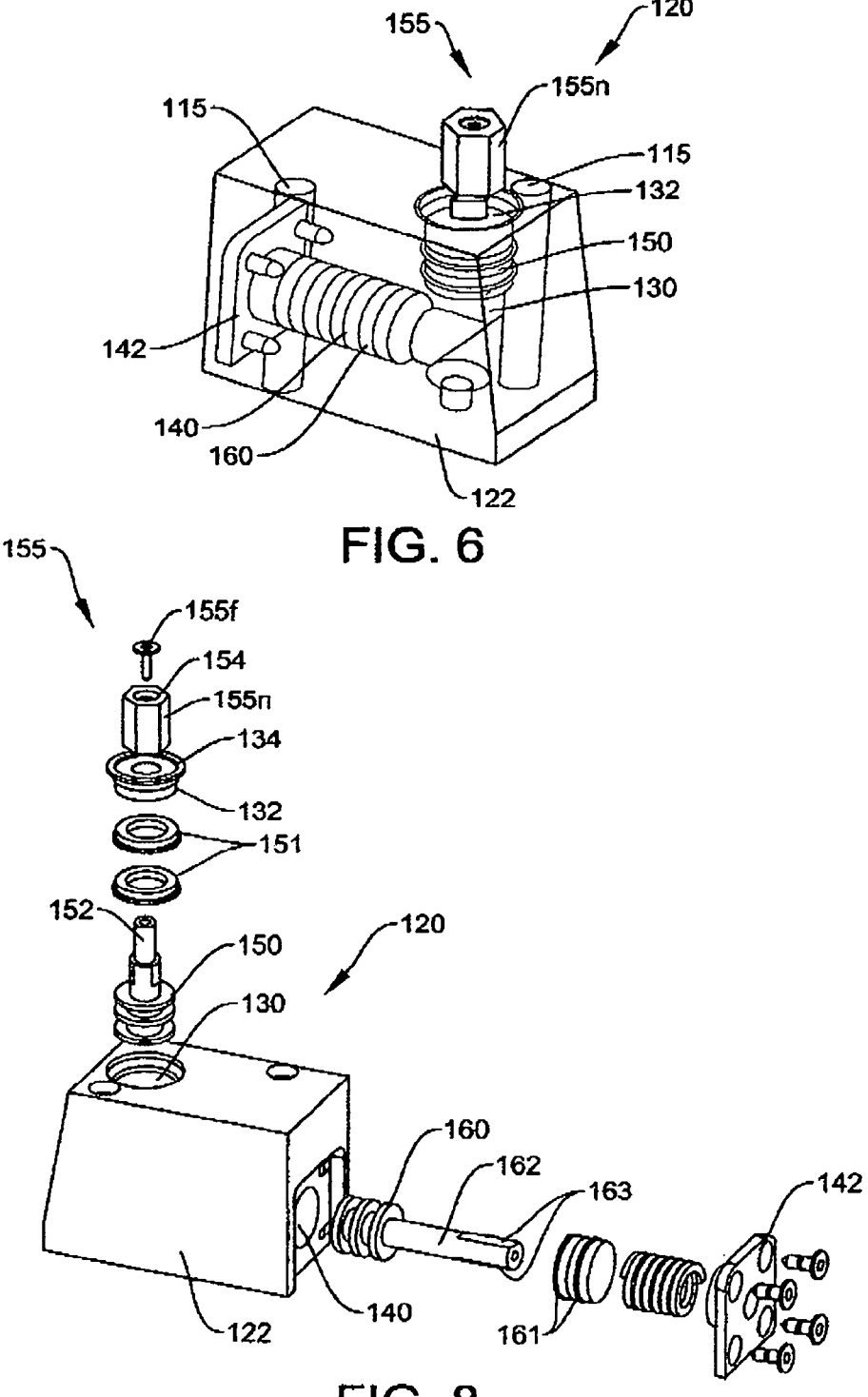
FIG. 6 is a perspective view from the cavity block engaging end of the first illustrated embodiment slide apparatus of FIG. 1.
FIG. 8 is an exploded perspective view of the first illustrated embodiment slide apparatus of FIG. 1.
Figure 7:
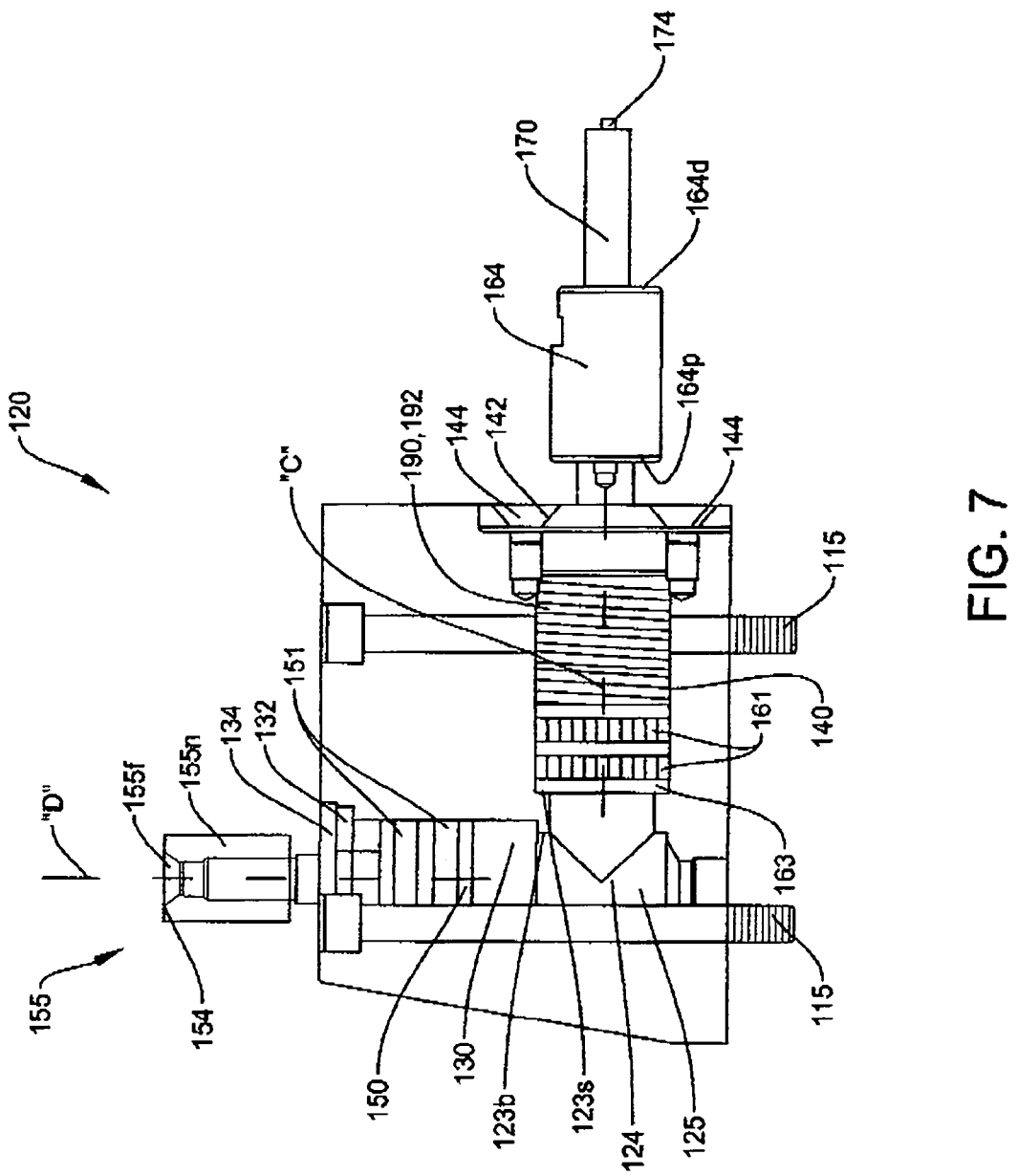
FIG. 7 is a side elevational view of the first illustrated embodiment slide apparatus of FIG. 1.
Figure 9:
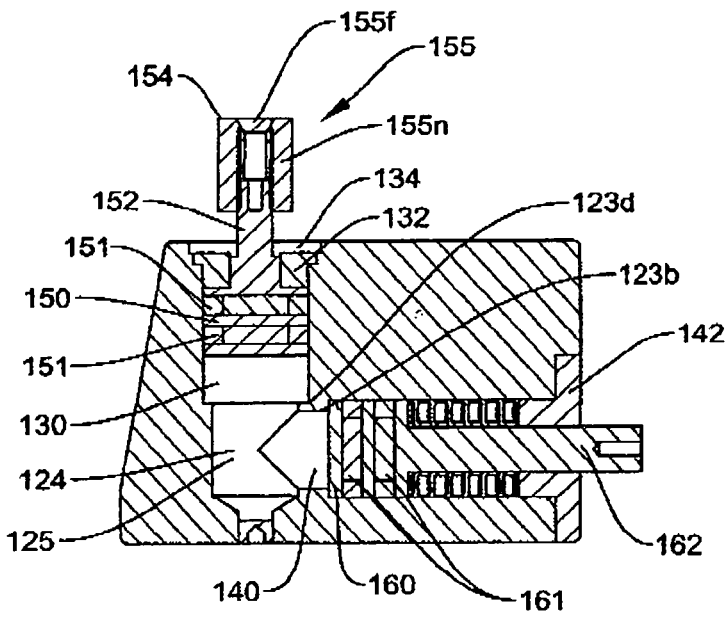
FIG. 9 is a cross-sectional side elevational view of the first illustrated embodiment slide apparatus of FIG. 1.
Figure 10:
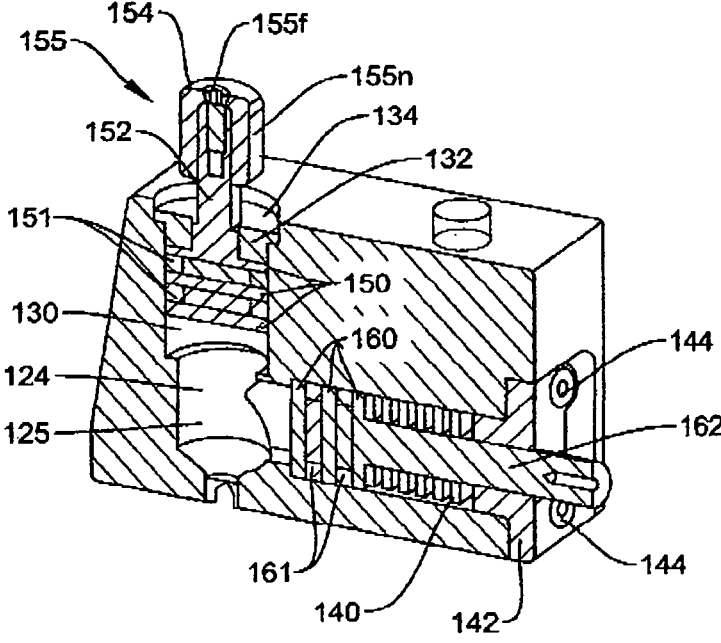
FIG. 10 is a cross-sectional perspective view of the first illustrated embodiment slide apparatus of FIG. 1.
Figure 11:
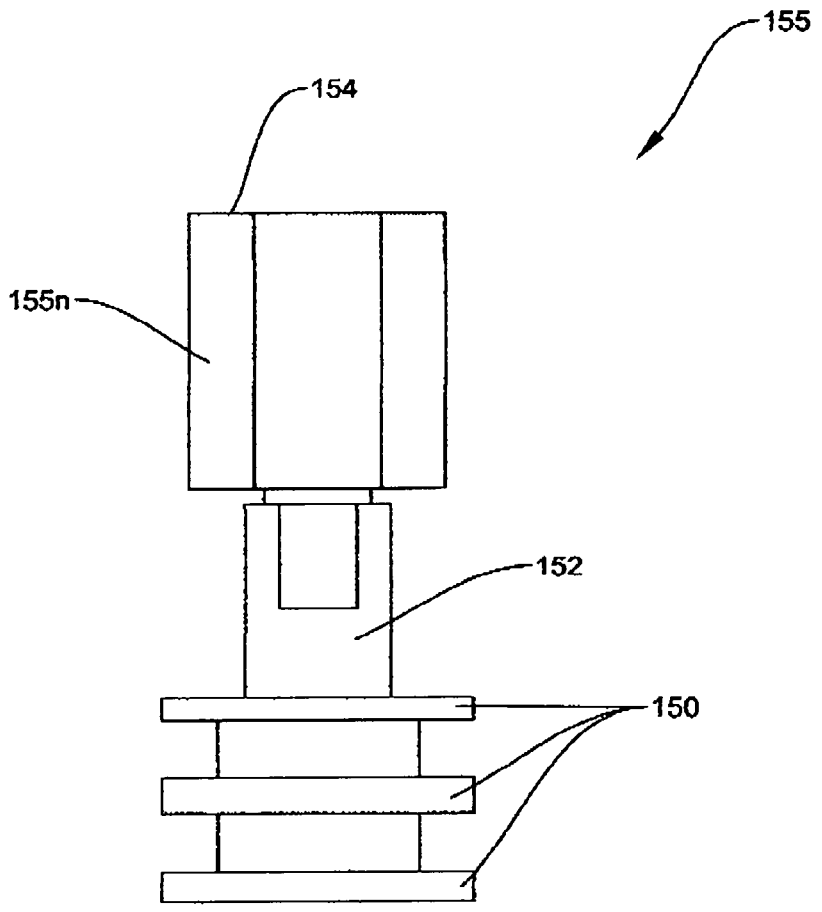
FIG. 11 is an enlarged side elevational view of the displacement adjustment mechanism on the drive-piston shaft of the first illustrated embodiment slide apparatus of FIG. 1.
Figure 12:
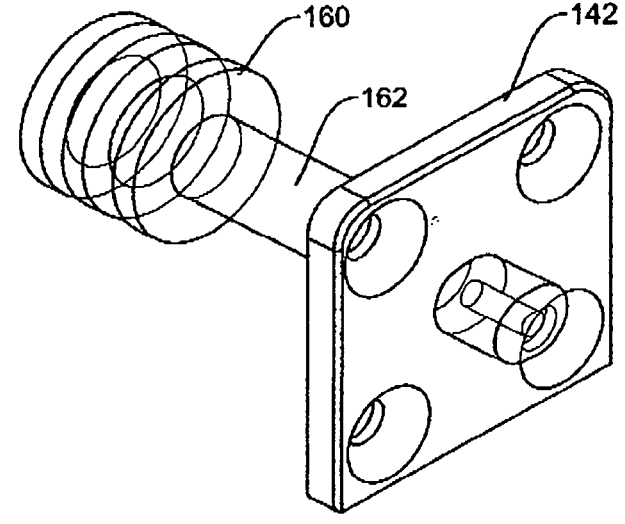
FIG. 12 is a perspective view of the carrier piston, the carrier-piston shaft and the carrier-cylinder cover plate in the first illustrated embodiment slide apparatus of FIG. 1.
Figure 13:
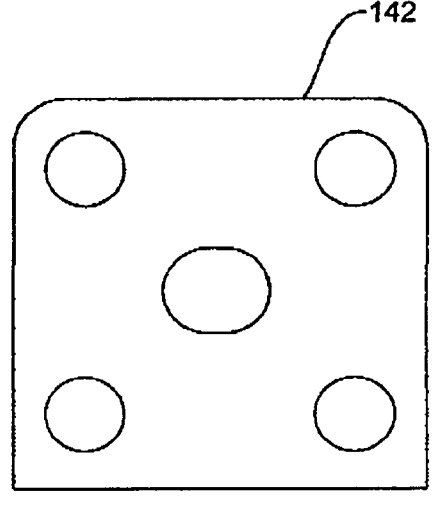
FIG. 13 is a front elevational view of the carrier-cylinder cover plate of FIG. 12.
Figure 15:
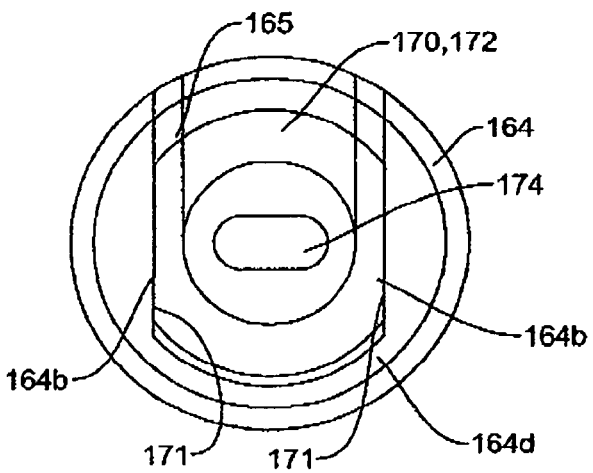
FIG. 15 is an end elevational view of the insert carrier and the insert member of the first illustrated embodiment slide apparatus of FIG. 1.
Figure 14:
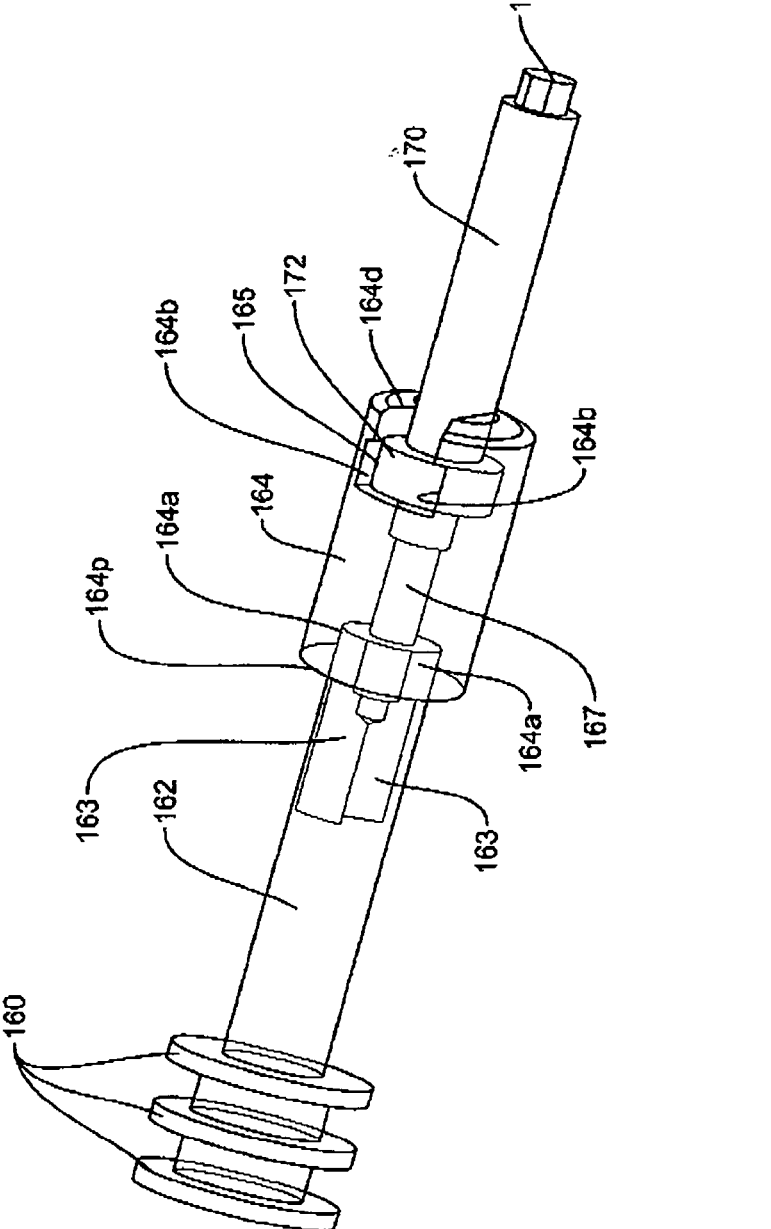
FIG. 14 is a perspective view of the carrier piston, the carrier-piston shaft, the insert carrier and the insert member of the first illustrated embodiment slide apparatus of FIG. 1.
Figure 16:
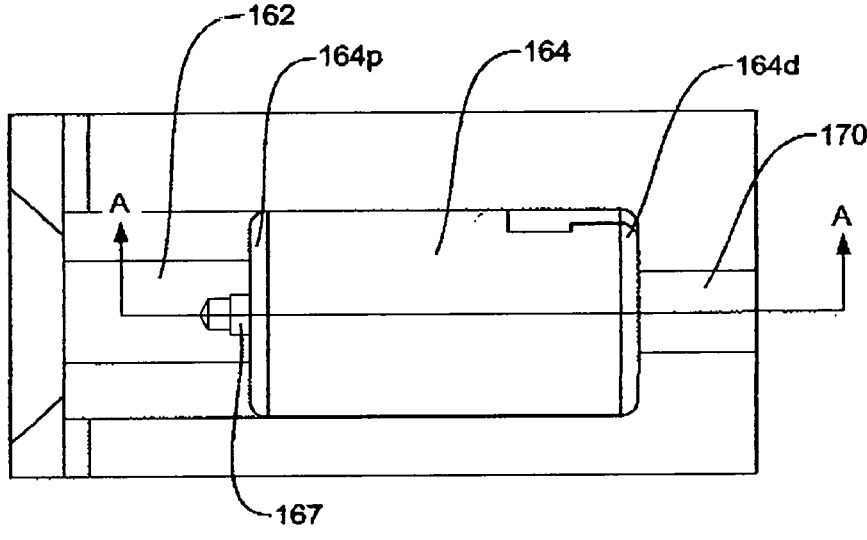
FIG. 16 is a side elevational view of an outer portion of the carrier-piston shaft, the insert carrier and a portion of the insert member of the first illustrated embodiment slide apparatus of FIG. 1.
Figure 17:
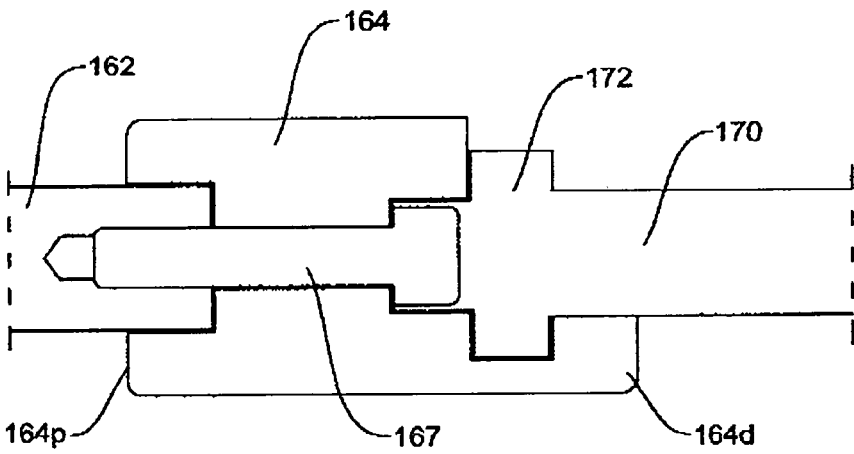
FIG. 17 is a sectional side elevational view of an outer portion of the carrier-piston shaft, the insert carrier and a portion of the insert member of FIG. 1, taken along section lines 17-17 of FIG. 16.
Figure 18:
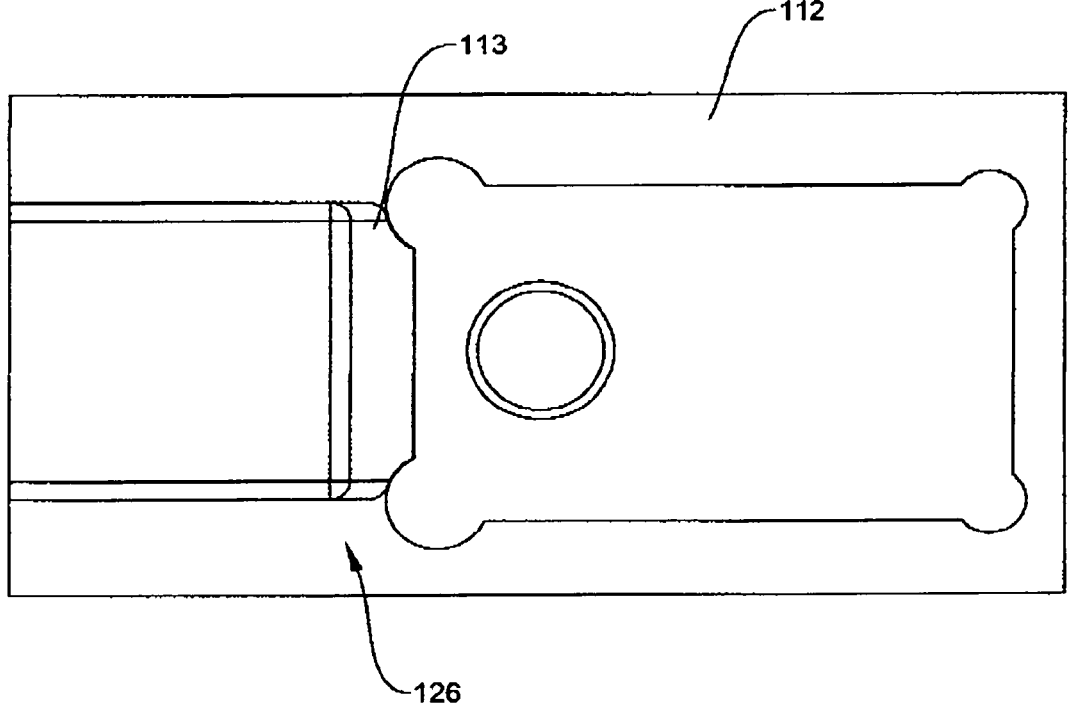
FIG. 18 is a bottom plan view of a portion of the cavity block of the first illustrated embodiment of the mold and slide apparatus system of FIG. 1.
Figure 19:
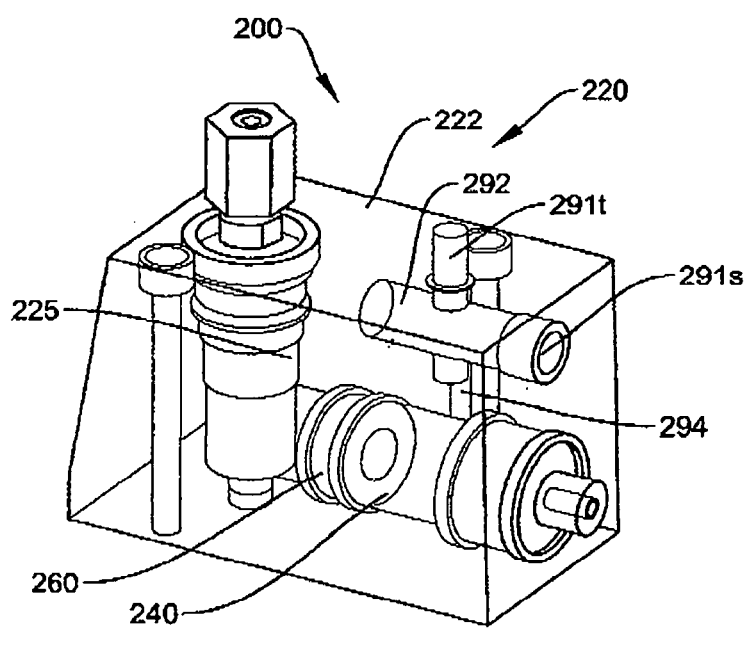
FIG. 19 is a perspective view of a second illustrated embodiment of the slide apparatus according to the present invention.
Figure 21:
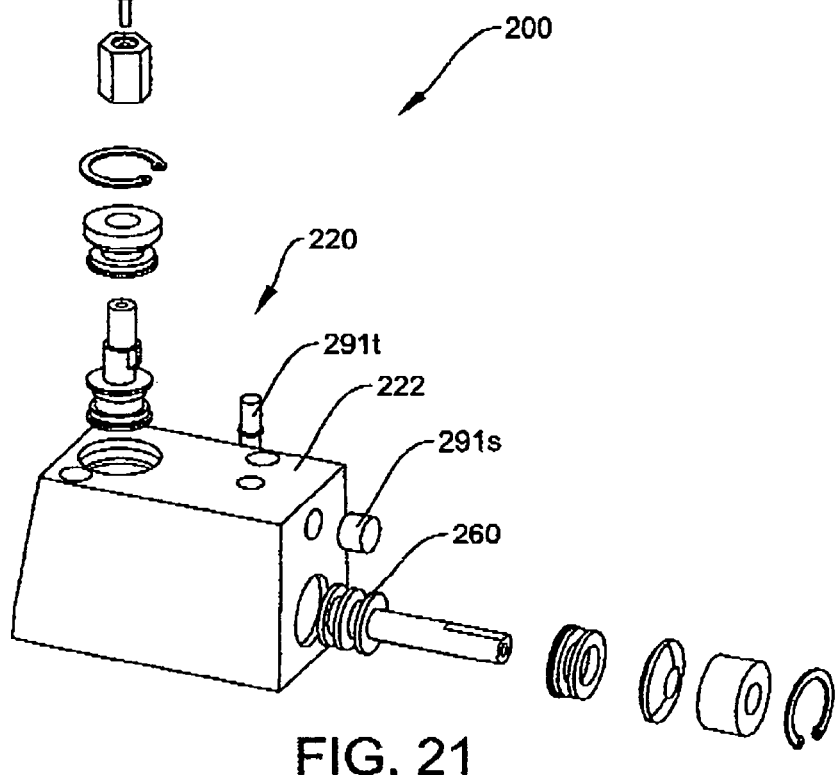
FIG. 21 is an exploded perspective view of the second illustrated embodiment of the slide apparatus according to the present invention.
Figure 20:
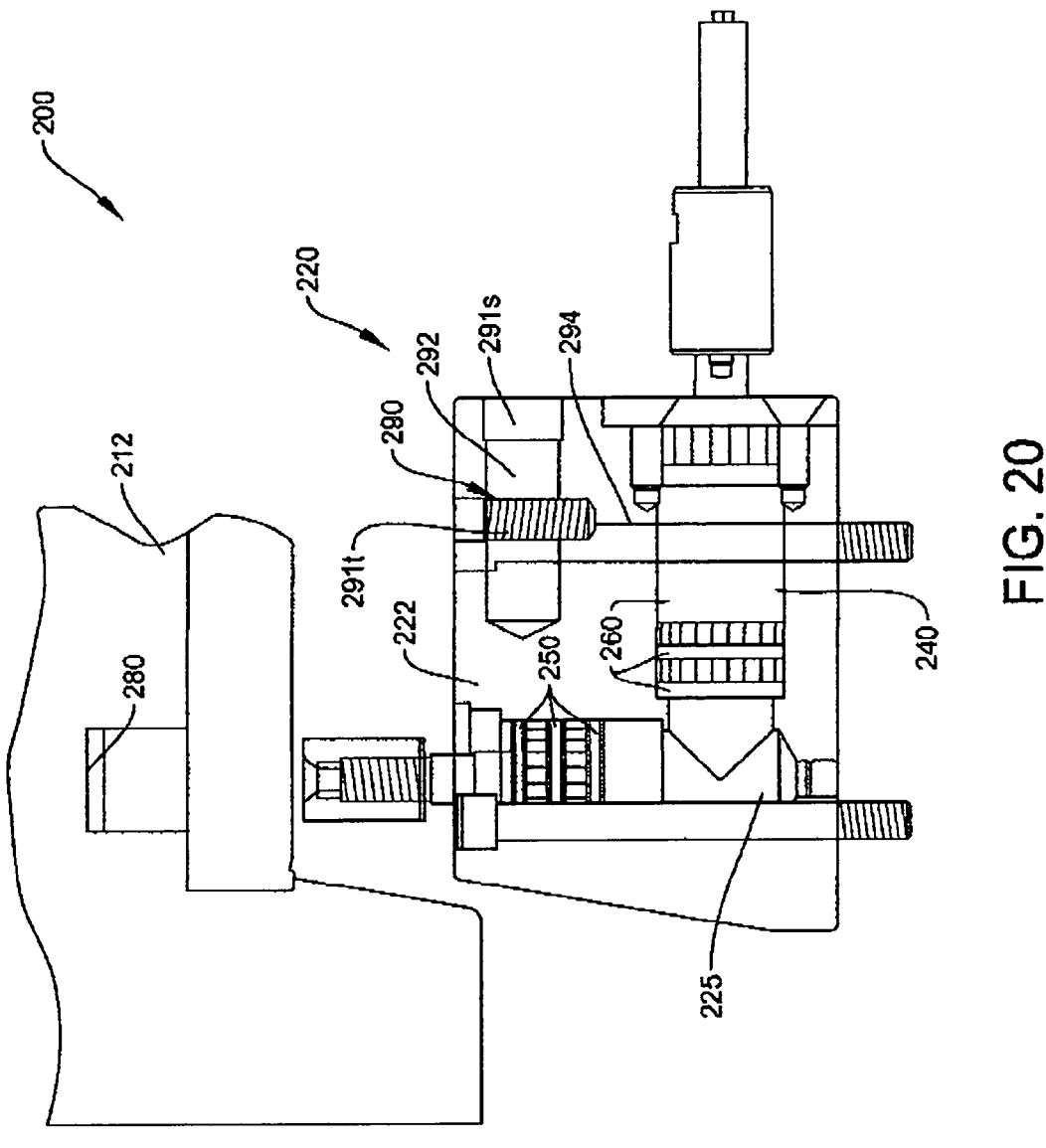
FIG. 20 is a side elevational view of the second illustrated embodiment of the slide apparatus according to the present invention.
Figure 22:
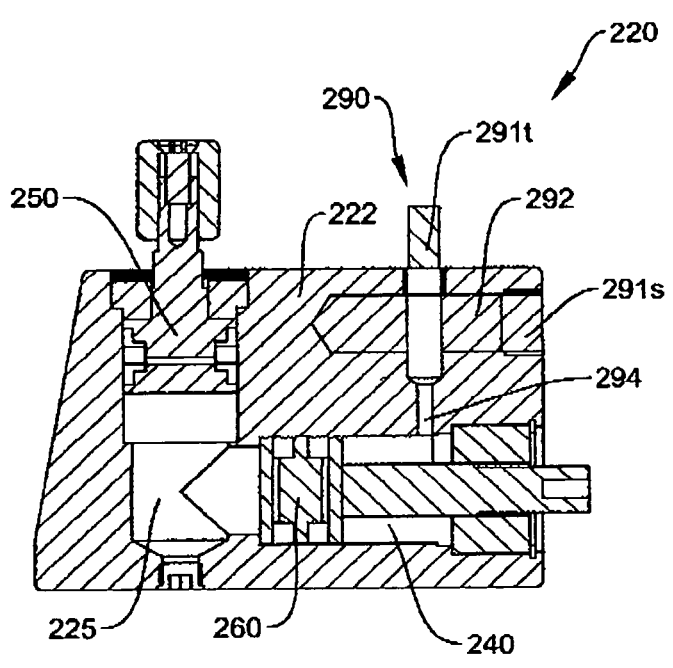
FIG. 22 is a sectional side elevational view of the second illustrated embodiment of the slide apparatus according to the present invention; and, FIG. 23 is a sectional perspective view of the second illustrated embodiment of the slide apparatus according to the present invention.
Figure 23:
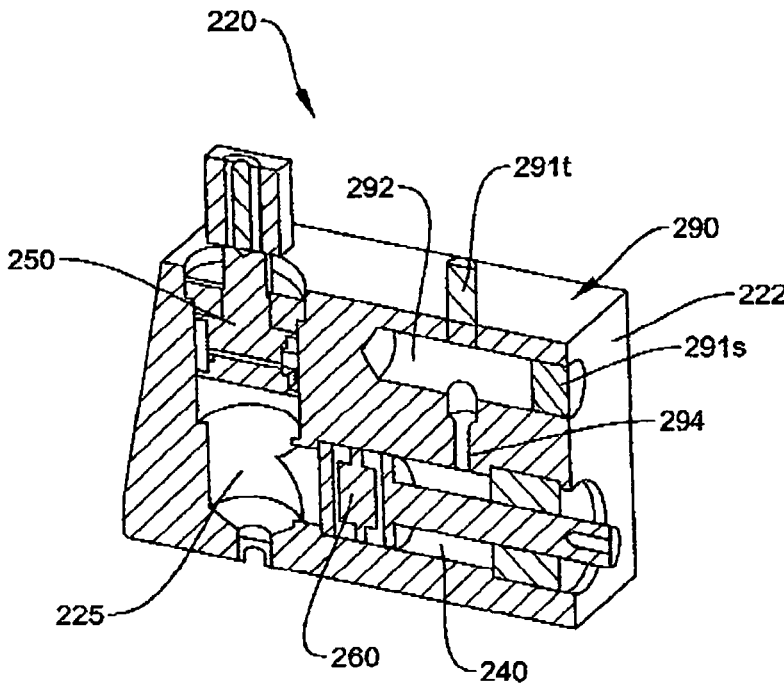

More specifically, the first illustrated embodiment of the mold and slide apparatus system 100 comprises a slide apparatus 120 and at least a first mold member 111 and a second mold member 112 that together define an internal cavitation 114. The first mold member 111 is disposed below the second mold member 112. The second mold member 112 moves vertically between an open configuration of the mold and slide apparatus system 100, as is best seen in FIGS. 1 and 2, and a closed configuration of the mold and slide apparatus system 100, as is best seen in FIG. 3. It can readily be seen that the first mold member 111 defines a large portion of the internal cavitation 114. As per the above cited structure, and as per convention in the industry, the first mold member 111 comprises a mold core block and the second mold member 112 comprises a mold cavity block. In the first illustrated embodiment, the slide apparatus 120 is mounted on the mold core block 111 in removable and replaceable relation by means of two threaded fasteners 115.

In the first illustrated embodiment, the actuator 180 comprises an actuating portion of the second mold member 112. More specifically, the actuating portion comprises an actuating surface on the second mold member 112. As can be readily seen, the actuator 180 is movable between a non-actuating position and an actuating position.

The slide apparatus 120 is mounted on the first mold member 111 for moving the insertable portion 174 of the insert member 170 into and out of the internal cavitation 114 in the first mold member 111. The slide apparatus 120 comprises a main body 122 having a drive cylinder 130 defining a drive-cylinder axis "D" that is preferably is vertically oriented and a carrier cylinder 140 defining a carrier cylinder axis "C" that is preferably horizontally oriented. There is also a drive-cylinder seal 132 retained in place by a snap ring 134 in the outer end of the drive cylinder 130 to retain the drive piston 150 operatively in place therein. Similarly, a carrier-cylinder cover plate 142 is retained in place by threaded fasteners 144 in the outer end of the carrier cylinder 140 to retain the carrier piston 160 operatively in place therein.

A drive piston 150 carrying hydraulic seals 151 and is disposed in sealed sliding relation in the drive cylinder 130 for movement along the drive-cylinder axis "D" between a start position and a fluid displacement position. A drive-piston shaft 152 is securely connected to the drive piston 150 and extends outwardly from the main body 122.

In order to receive actuating surface of the actuator 180 on the second mold member 112, the drive-piston shaft 152 has an actuator receiving surface 154 on the tip end thereof that receives the actuating portion of the actuator 180 in operative engagement thereagainst. Preferably, there is a displacement adjustment mechanism 155 on the drive-piston shaft 152, to permit selective adjustment of the position of the actuator receiving surface 154 with respect to the actuator 180. The actuator receiving surface 154 is disposed on the displacement adjustment mechanism 155. The displacement adjustment mechanism 155 comprises an adjusting nut 155n threadably engaged on the drive-piston shaft 152. The adjusting nut 155n is secured in a selected vertical position by means of a locking threaded fastener 155f.

When the actuator 180 is in the non-actuating position, the actuator 180 may remain in contact with the actuator receiving surface 154 on the drive-piston shaft 152, or may be displaced in separated relation away from the actuator receiving surface 154 of the drive-piston shaft 152. When the actuator 180 is in the actuating position, the actuator 180 operatively engages the drive-piston shaft 152.

The carrier piston 160 carrying hydraulic seals 161 is disposed in sealed sliding relation in the carrier cylinder 140 for movement along the carrier cylinder axis "C" between a retracted position and an extended position. The insert member 170 is connected to the carrier piston 160, as will be discussed in greater detail subsequently, for movement therewith for engaging the internal cavitation 114 when the carrier piston 160 is in the extended position.

A carrier-piston shaft 162 is securely connected to the carrier piston 160 and extends outwardly from the main body 122. An insert carrier 164 is secured to the free end of the drive-piston shaft 152 preferably by means of a threaded fastener 167, as illustrated, or my any other suitable means. The insert carrier 164 has a proximal end 164p and a distal end 164d. The insert member 170 is carried in removable and replaceable relation by the insert carrier 164 and extends outwardly from the distal end of the insert carrier 164.

As can be best seen in FIG. 14 through 17, the insert member 170 has a head portion 172 dimensioned to fit in removable and replaceable relation within a co-operating recess 165 in the insert carrier 164, to thereby retain the insert member 170 in place during longitudinal movement of the carrier piston 160, the carrier shaft, the insert carrier 164, and the insert member 170.

The carrier-piston shaft 162 has a pair of opposed alignment surfaces 163 thereon for rotationally fixed engagement with co-operating first pair of opposed alignment surfaces 164a on the insert carrier 164 to thereby permit accurate rotational alignment of the insertable portion 174 of the insert member 170 with a receiving aperture 111a in the first mold member 111 leading to the internal cavitation 114.

The insert member 170 has a pair of opposed alignment surfaces 171 thereon for rotationally fixed engagement with a co-operating second pair of alignment surface 164b on the insert carrier 164, to thereby permit accurate rotational alignment of the insertable portion 174 of the insert member 170 with the receiving aperture 111a in the first mold member 111 leading to the internal cavitation 114. The alignment surface of the insert member 170 is disposed on the head portion 172 of the insert member 170 and the co-operating second alignment surface 164b is disposed on the co-operating recess 165 in the insert carrier 164. The insertable portion 174 of the insert member 170 extends outwardly from the free end of the insert member 170.

There is also a fluid communication passage 124 interconnecting the drive-cylinder and the carrier cylinder 140 in fluid communication one with the other, with the fluid communication passage 124 filled with hydraulic fluid 125. The fluid communication passage 124 is narrower than the drive-cylinder and the carrier cylinder 140. An annular boss 123b between the drive cylinder 130 and the fluid communication passage 124 acts as an abutment surface for the drive piston 150 to define its fully displaced fluid displacement position. Similarly, an annular shoulder 123s between the drive cylinder 130 and the fluid communication passage 124 acts as an abutment surface for the carrier piston 160 to define its fully retracted position.

Movement of the drive piston 150 from its start position to its fluid displacement position causes, via the hydraulic fluid 125, the carrier piston 160 to move from its retracted position to its extended position. Similarly, movement of the carrier piston 160 from its extended position to its retracted position causes, via the hydraulic fluid 125, the drive piston 150 to move from its fluid displacement position to its start position.

In order to secure the slide apparatus 120 in place during a molding operation, especially during a high pressure injection molding operation, the present invention comprises a slide stop arrangement, as indicated by the general reference numeral 126, as follows.

The slide apparatus 120 has a contact portion 127 oriented substantially transversely to the carrier cylinder axis "C" and facing away from the insert member 170. As illustrated, the contact portion 127 comprises a substantially flat contact surface 127 is angled to at least some degree faces the second mold member 112.

Correspondingly, there is a slide stop portion 113 facing the contact portion 127 of the slide apparatus 120 and for engaging the contact portion of the slide apparatus 120 to thereby act to reinforce the slide apparatus 120 during the molding operation. The slide stop portion 113 is movable between an abutting position whereat the slide stop portion 113 engages the contact portion of the slide apparatus 120, as aforesaid, and a retracted position whereat the slide stop portion 113 is removed from the abutting position. As illustrated, the slide stop portion 113 is disposed on the second mold member 112 for movement therewith, and comprises a substantially flat slide stop surface 113. The slide stop surface 113 is angled to flatly contact the substantially flat contact surface 127 on the slide apparatus 120. The closed configuration of the mold and slide apparatus system 100 corresponds to the contacting position of the slide stop surface 113 and the contact surface 127.

The present invention also comprises the biasing mechanism 190, which is operable to return the carrier piston 160 to the retracted position. In the first illustrated embodiment, the biasing mechanism 190 comprises a coil spring member 192 operatively mounted between the carrier piston 160 and the main body 122 of the slide apparatus 120, in a co-operating recess 194 in the slide apparatus 120. If desired, the coil spring member 192 may be in slight compression even when the carrier piston 160 is in its retracted position and the drive piston 150 is in its start position, to ensure that the drive piston 150 fully returns to its start position.

In use, in order to have the insertable portion 174 of the insert member 170 in place in the internal cavitation 114 during the required time period of the molding cycle of the molding operation, the actuator 180 is used in conjunction with the second mold member 112, namely the mold cavity block. Movement of the actuator 180 from its non-actuating position to its actuating position causes the drive piston 150 to move from its start position to its fluid displacement position, thereby causing the carrier piston 160 to move from its retracted position and its extended position to correspondingly move the insertable portion 174 of the insert member 170 into the internal cavitation 114 during a molding operation. Subsequently, during the remainder of the molding cycle of the molding operation, when the molded part is to be ejected, in order to remove the insertable portion 174 of the insert member 170 from the internal cavitation 114, the biasing mechanism 190 moves the carrier piston 160 to move from its extended position to its retracted position, thereby moving the drive piston 150 from its fluid displacement position to its start position, and correspondingly moving the actuator 180 from its actuating position to its non-actuating position.

Reference will now be made to FIGS. 19 through 23, which show a second illustrated embodiment of the mold and slide apparatus system 200 according to the present invention. As can be readily seen in the Figures, the second illustrated embodiment of the mold and slide apparatus system 200, is similar to the first illustrated embodiment of the mold and slide apparatus system 200, except that the biasing mechanism 290, which is still retained in the main body 222 of the slide assembly 220, comprises an air chamber 292 sealed by a top plug 291*t* and a side plug 291*s*, and having an access passage 294 disposed in fluid communication with the carrier cylinder 240, with the carrier piston 260 operatively disposed between the access passage 294 and the hydraulic fluid 225. As the carrier piston 260 moves from its retracted position to its extended position, the carrier piston 260 compresses the air in the carrier cylinder 240 into the air chamber 292 through the access passage 294. Subsequently, during the remainder of the molding cycle of the molding operation, when the molded part is to be ejected, in order to remove the insertable portion 274 of the insert member 270 from the internal cavitation (not specifically shown), when the actuator 280 on the second mold member 212 moves upwardly from its actuating position to its non-actuating position, the compressed air in the air chamber 292 moves the carrier piston 260 to move from its extended position to its retracted position, thereby moving the drive piston 250 from its fluid displacement position to its start position, and correspondingly moving the actuator 280 from its actuating position to its non-actuating position.

As can be understood from the above description and from the accompanying drawings, the present invention provides a slide apparatus that overcomes the known problems and disadvantages of conventional prior art slide members, that does not have a horn pin, that does not experience the problem of significant friction, that does not experience the problem of excessive wear of the slide member, that takes fewer threaded fasteners to mount, that does not experience the problem of being difficult to adjust in terms of "fine tuning" its position, that does not have wear plates, that does not have gibs, which are used to guide and control linear movement of the slide member, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the combination infant mat and carrying bag, of the present invention, without departing from the spirit and scope of the accompanying claims.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Illustrated embodiments of this invention are described herein. Variations of those illustrated embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mold and slide apparatus system comprising:
   at least a first mold member and a second mold member that together define an internal cavitation; and a slide apparatus mounted on the first mold member for moving the insertable portion of an insert member into and out of an internal cavitation in the first mold member;

wherein the slide apparatus comprises:

a main body having a drive cylinder defining a drive-cylinder axis and a carrier cylinder defining a carrier-cylinder axis;

a drive piston disposed in sealed sliding relation in the drive cylinder for movement along the drive-cylinder axis between a start position and a fluid displacement position;

a carrier piston disposed in sealed sliding relation in the carrier cylinder for movement along the carrier-cylinder axis between a retracted position and an extended position, wherein the insert member is connected to the carrier piston for movement therewith for engaging the internal cavitation when the carrier piston is in the extended position;

a fluid communication passage interconnecting the drive cylinder and the carrier cylinder in fluid communication one with the other, with the fluid communication passage filled with hydraulic fluid;

wherein movement of the drive piston from its start position to its fluid displacement position causes, via the hydraulic fluid, the carrier piston to move from its retracted position to its extended position;

wherein movement of the carrier piston from its extended position to its retracted position causes, via the hydraulic fluid, the drive piston to move from its fluid displacement position to its start position; an actuator movable between a non-actuating position and an actuating position, wherein the actuator comprises an actuating portion of the second mold member;

wherein, movement of the actuator from its non-actuating position to its actuating position causes the drive piston to move from its start position to its fluid displacement position, thereby causing the carrier piston to move from its retracted position and its extended position to correspondingly move the insertable portion of the insert member into the internal cavitation during a molding operation;

a biasing mechanism operable to return the carrier piston to the retracted position; and a drive-piston shaft securely connected to the drive piston, wherein the drive-piston shaft extends outwardly from the main body, wherein when the actuator is in the non-actuating position, the actuator is displaced in separated relation away from drive-piston shaft, and when the actuator is in the actuating position the actuating the actuator operatively engages the drive-piston shaft, and wherein the drive-piston shaft has an actuator receiving surface.

2. A mold and slide apparatus system according to claim 1, wherein the drive-cylinder axis is vertically oriented.

3. A mold and slide apparatus system according to claim 1, wherein the fluid communication passage is narrower than the drive cylinder and the carrier cylinder.

4. A mold and slide apparatus system according to claim 1, wherein the slide apparatus has a contact portion oriented substantially transversely to the carrier-cylinder axis and facing away from the insert member, and further comprising a slide stop portion facing the contact portion of the slide apparatus and for engaging the contact portion of the slide apparatus to thereby act to reinforce the slide apparatus during the molding operation, wherein the slide stop portion is movable between an abutting position whereat the slide stop portion engages the contact portion of the slide apparatus, as aforesaid, and a retracted position whereat the slide stop portion is removed from the abutting position, wherein the slide stop portion is disposed on the second mold member for movement therewith, wherein the slide stop portion comprises a slide abutment surface, wherein the slide abutment surface is substantially flat, and wherein the slide abutment surface is angled to at least some degree faces the second mold member.

5. A mold and slide apparatus system according to claim 1, wherein the first mold member is disposed below the second mold member, wherein the second mold member moves vertically between an open configuration of the mold and slide apparatus system and a closed configuration of the mold and slide apparatus system, wherein the closed configuration of the mold and slide apparatus system corresponds to the abutting position of the slide stop portion.

6. A mold and slide apparatus system according to claim 1, further comprising a displacement adjustment mechanism on the drive-piston shaft, and wherein the actuator receiving surface is disposed on the displacement adjustment mechanism, and wherein the displacement adjustment mechanism comprises an adjusting nut threadibly engaged on the drive-piston shaft.

7. A mold and slide apparatus system according to claim 1 further comprising a drive-cylinder cover plate disposed in the outer end of the drive cylinder to retain the drive piston operatively in place therein, and further comprising a carrier-cylinder cover plate disposed in the outer end of the carrier cylinder to retain the carrier piston operatively in place therein.

8. A mold and slide apparatus system according to claim 1, further comprising a carrier-piston shaft securely connected to the carrier piston, wherein the carrier-piston shaft extends outwardly from the main body, and further comprising an insert carrier secured to the free end of the carrier-piston shaft.

9. A mold and slide apparatus system according to claim 8, wherein the insert carrier secured to the free end of the carrier-piston shaft by means of a threaded fastener.

10. A mold and slide apparatus system according to claim 8, wherein the insert carrier has a proximal end and a distal end and the insert member extends outwardly from the distal end of the insert carrier, and wherein the carrier-piston shaft has an alignment surface thereon for rotationally fixed engagement with a co-operating first alignment surface on the insert carrier to thereby permit accurate rotational alignment of the insertable portion of the insert member with a receiving aperture in the first mold member leading to the internal cavitation.

11. A mold and slide apparatus system according to claim 10, wherein the insert member is carried in removable and replaceable relation by the insert carrier, wherein the insert member has a head portion dimensioned to fit in removable and replaceable relation within a co-operating recess in the insert carrier, wherein the insert member has an alignment surface thereon for rotationally fixed engagement with a co-operating second alignment surface on the insert carrier to thereby permit accurate rotational alignment of the insertable portion of the insert member with a receiving aperture in the first mold member leading to the internal cavitation, wherein the alignment surface of the insert member is disposed on the head portion of the insert member and the co-operating second alignment surface is disposed on the co-operating recess in the insert carrier.

* * * * *